United States Patent [19]
Brady

[11] Patent Number: 5,202,644
[45] Date of Patent: Apr. 13, 1993

[54] RECEIVER APPARATUS
[75] Inventor: Matthew E. Brady, Inglewood, Calif.
[73] Assignee: Ail Systems, Inc., Deer Park, N.Y.
[21] Appl. No.: 819,778
[22] Filed: Jun. 11, 1959
[51] Int. Cl.$^5$ ............................................. H04L 27/22
[52] U.S. Cl. ..................................... 329/313; 329/311; 375/94
[58] Field of Search ............... 324/88, 79, 82; 250/20, 250/41 P; 329/104, 107, 311, 313, 108, 113, 155; 375/80, 94

[56] References Cited
U.S. PATENT DOCUMENTS

| | | | |
|---|---|---|---|
| 2,476,445 | 7/1949 | Lacy | 324/77 E X |
| 2,602,162 | 7/1952 | Kenyon | 328/191 |
| 2,608,652 | 8/1952 | Heller | 328/108 X |
| 2,654,027 | 9/1953 | Baum | 329/313 X |

Primary Examiner—Gilberto Barrón, Jr.
Attorney, Agent, or Firm—C. H. Grace

[57] ABSTRACT

In a communications-receiving system for demodulating phase-coded signals and displaying the resultant information on a cathode-ray tube (CRT), an information code is modulated on a carrier by shifting the phase of the carrier by an integral multiple of predetermined phase step. At the receiver a locally generated reference signal is compared with received pulses to ascertain their phase offsets. The resulting demodulated information is presented in a CRT display that indicates not only the received information but also, by the slope of bright dots, the frequency difference between the local reference and the signal, so that frequency drift can be corrected. The CRT's horizontal sweep represents time and the vertical sweep represents phase angle. The start of each vertical sweep is synchronized with zero-crossings of the locally generated reference signal. The intensity of the CRT beam is controlled by the message. The vertical position of bright message spots therefore indicates the phase difference between the received signal carrier and the locally generated reference signal at the instant of a zero-crossing.

18 Claims, 3 Drawing Sheets

RECEIVER APPARATUS

The present invention relates in general to communication systems whose transmissions are phase coded and more particularly to receiver apparatus utilizable in such systems for both demodulating the phase-coded signals and displaying the resultant information on a cathode ray tube.

In general, one type of communication system is a pulse system wherein the carrier-wave frequency and phase are maintained constant during the interval of each pulse, but the phase of the radio-frequency energy is changed from pulse to pulse in a prescribed manner to convey intelligence. Modulation of the carrier is performed in a way such that the phase of the carrier assumes one of several equally spaced values relative to a specified reference phase. A significant advantage in obtaining modulation of this type is that it permits the transmission of at least two binary digits or bits of information per pulse. Demodulation of the transmitted signals at the receiver ultimately involves a comparison of the carrier phase of each received information pulse with either the carrier phase of reference pulses which have been suitably interleaved with the information pulses or the phase of a locally generated reference oscillation.

More particularly, the type of communication system under discussion is one in which the unmodulated carrier consists of pulses of radio-frequency energy produced by periodically gating the output of a continuously running oscillator. An information code is modulated on this carrier by shifting the phase of the carrier for successive pulses by zero or an integral multiple of $2\pi/N$ radians. The transmitted signal then consists of a series of radio-frequency pulses, each pulse having one of N possible phases relative to the basic carrier oscillation.

If a replica of the carrier signal were transmitted over a separate channel to the receiver, this would provide a reference against which to compare the modulated pulses during the demodulation process. Such a channel would introduce a delay identical to that encountered in the message channel and, ideally, would be noise free. However, in many respects it is oftentime preferable to employ a system in which demodulation is accomplished against a locally generated reference signal. Accordingly, the receiver apparatus of the present invention will be described herein as employing a locally generated reference oscillation but it should be understood that it is not limited thereto.

In generating such a local reference signal, the problem then becomes that of generating the signal so that it will have the same frequency and phase that a transmitted reference would have had at the output of the intermediate-frequency stage of the receiver. The received pulses may then be compared with this local reference in a phase-sensitive detector in which the sign and magnitude of the phase differences are determined. The result of each phase comparison successively presented at the receiver output is, therefore, the demodulated information. Receiver apparatus of the type under discussion, therefore, has three basic functions, namely, generation of a reliable local reference signal, demodulation, and presentation of the demodulated signals, these being in addition to the functions of amplification and band-limiting which are common to all types of receiver systems.

It is, therefore, an object of the present invention to provide receiver apparatus for demodulating phase-coded signals and visually presenting the resultant information.

It is a further object of the present invention to provide receiver apparatus in which demodulation is accomplished with the aid of a locally generated reference oscillation whose frequency may be accurately maintained.

The receiver apparatus of the present invention accomplishes the three required functions by the use of a novel cathode-ray tube display which not only indicates the average frequency difference between the local reference and the signal carrier so that corrective steps can be taken to bring them into alignment but also demodulates the coded signals and simultaneously presents the resultant information in visual form. More specifically, both horizontal and vertical sawtooth sweeps are projected upon the face of the cathode-ray tube, the horizontal sweep representing time and the vertical sweep representing phase angle measured with respect to the reference signal. The start of each horizontal sweep is synchronized with the start of each repetition of the message section being read out of a storage medium upon which the received message has previously been recorded. The start of the vertical sweeps, on the other hand, is synchronized with the positive zero-crossings of the locally generated reference signal or one of its harmonies. It will therefore be obvious that many more vertical than horizontal sweeps are produced.

Considering the matter still further, the Z-axis or intensity of the cathode-ray tube beam is controlled by the message signals. Specifically, each positive zero-crossing of the signal carrier causes a short rectangular brightening pulse to be generated which, in turn, produces a bright spot on the face of the tube, the vertical position of each such spot indicating the phase difference between the received signal carrier and the locally generated reference signal at the instant of a positive zero-crossing of the former. Since frequency is the time rate of change of phase, a frequency difference between the signal and the reference will manifest itself as a successive change in the vertical position of subsequent spots. If the frequency difference is constant, the change of phase with time will be linear and the spots will fall on a straight line, a positive or negative slope respectively indicating a positive or negative frequency error of the reference signal. Consequently, when a linearly sloping formation of spots is observed, the frequency of the reference signal is either manually or automatically corrected until the line formed by these spots is horizontal. When this is done, the frequency of the reference signal is then substantially the same as that of the carrier of the received message pulses.

Although the series of brightened spots representing a message pulse now fall on a horizontal line segment, the segments representing different pulses have different vertical positions on the face of the cathode-ray tube, their relative positions depending upon their modulation, that is to say, on the relative phases of the pulse carriers. If the phase of the reference signal driving the vertical sweep is shifted, the line segments representing the different pulses may be moved vertically until they fall under horizontal lines scribed over the tube face. The operator may then visually decode the message according to the phase-code used. The storage read-out is then shifted to the next section of the message, necessary readjustment of the reference frequency made, and demodulation and presentation accomplished in the same manner as heretofore described.

The novel features which are believed to be characteristic of the invention, both as to its organization and method of operation, together with further objects and advantages thereof, will be better understood from the following description considered in connection with the accompanying drawings in which embodiments of the invention are illustrated by way of example. It is to be expressly understood, however, that the drawings are for the purpose of illustration and description only and are not intended as a definition of the limits of the invention.

Figure 1:
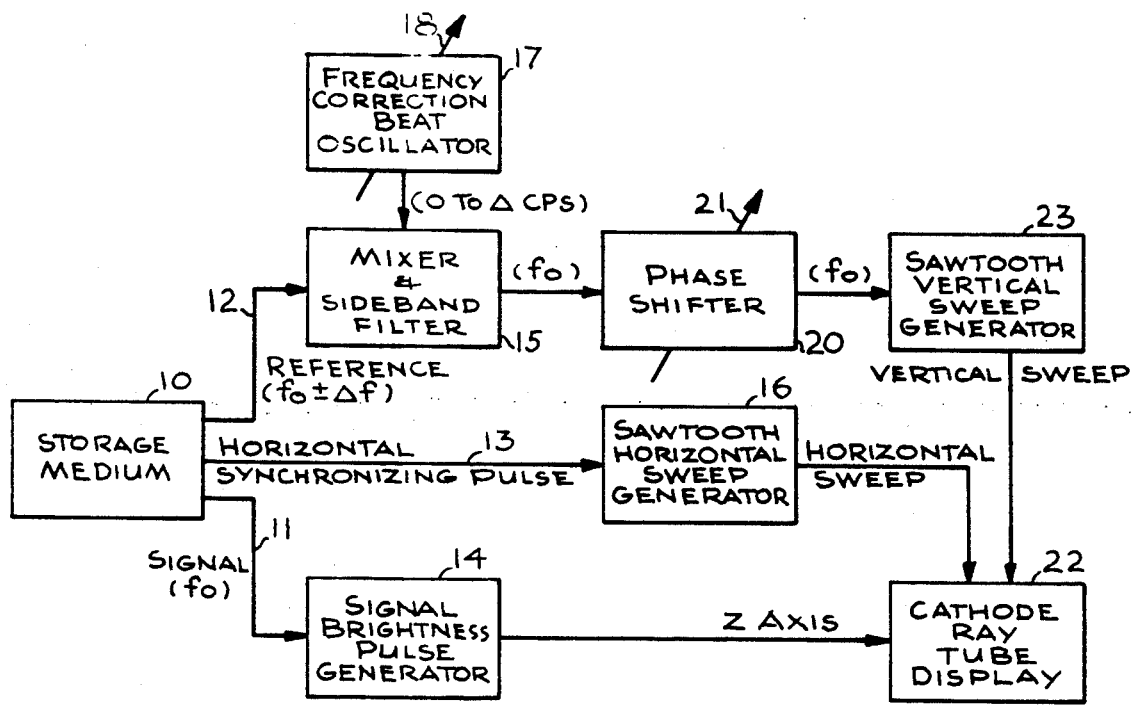
FIG. 1 shows a block diagram of one embodiment of receiver apparatus according to the present invention.
Figure 2:
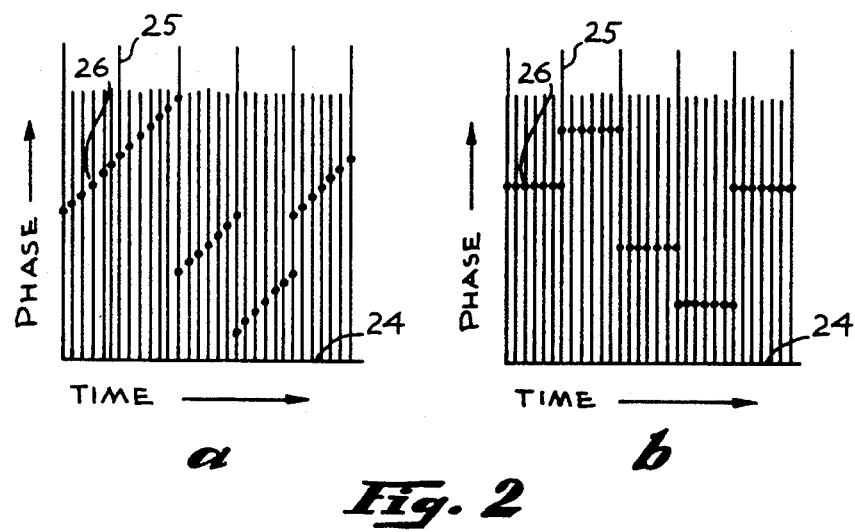
FIGS. 2a and 2b illustrate the type of patterns that may appear on the face of the cathode-ray tube in the embodiment of FIG. 1.

Referring now to the drawings and in particular to FIGS. 1 and 2 therein, the receiver apparatus of FIG. 1 includes, first, a storage device 10 which is capable of recording the phase-coded message pulses out of the intermediate-frequency stage of the receiver and then repetitively playing back desired portions thereof at a selected rate. Such a storage device is needed because the correction of the local reference frequency and the reading of the demodulated signal presentation must be done in sequence by the operator and this requires a finite amount of time. Consequently, the cathode-ray tube displays relating to each section of the message must be preserved until the operator is ready to proceed to the next section. Furthermore, storage device 10 should also be a multi-channel device so that signals other than the message pulses, such as the locally generated reference signal, may simultaneously be recorded and played back. Storage devices of the type required are known and available, one such storage device that may be adapted for present use being shown and described in U.S. Pat. No. 2,814,030, entitled "Visual Translator", invented by B. F. Miller et al and issued Nov. 19, 1957.

Considering storage device 10 still further, it is shown as having three output lines 11, 12 and 13, the message signals at frequency $f_0$ being produced at line 11, the reference signal at frequency ($f_0 \pm \Delta f$), where $\Delta f$ is an incremental variation of $f_0$, being produced at line 12, and a horizontal synchronizing pulse coinciding in time with the beginning of each scan of a message section being generated at line 13. The synchronizing pulse may be generated by means of a permanent magnet mounted on the scanner and periodically moving past a stationary pickup coil.

Output lines 11, 12 and 13 are respectively connected to a signal brightness pulse generator 14, a mixer and side-band filter circuit 15 and a sawtooth horizontal sweep generator 16, the mixer and side band filter circuit being connected at a second input terminal to a frequency correction beat oscillator 17. Circuit 17 is a standard type of oscillator whose frequency may be varied from zero to delta cycles per second, as indicated by arrow 18 running through the block representing the oscillator. Mixer and side-band filter circuit 15 are connected to a conventional phase shifter circuit 20 whose function it is to vary the phase of signals applied to it, the variability of the phase shifting being indicated by arrow 21 running through the block representing the phase shifter. Between phase shifter 20 and the horizontal plates of a cathode-ray tube 22, there is connected a sawtooth vertical sweep generator 23, as shown. The vertical plates of tube 22, on the other hand, are connected to sawtooth horizontal sweep generator 16. Finally, signal brightness pulse generator 14 is connected to the cathode of the cathode-ray tube for reasons that will be more fully understood later.

With respect to both signal brightness pulse generator 14 and vertical sweep generator 23, each of these circuits may comprise a high gain amplifier and a differentiating circuit connected in tandem. The amplifier both amplifies and clips the signal oscillations applied to it so as to produce a rectangular rather than a sinusoidal oscillation at its output, the differentiating circuit thereafter producing positive and negative voltage spikes in accordance with the occurrence of the leading and lagging edges respectively of the amplifier output signal. In sweep generator 23 the positive voltage spikes may then be used to trigger the production of a sawtooth voltage for application to the horizontal plates of cathode-ray tube 22 whereas in brightness generator 14 the positive voltage spikes may be used to trigger short rectangular pulses for application to the tube cathode.

Considering now the operation, when a message comprising a sequence of phase-coded pulsed carrier signals is received, the message signals as well as a locally generated reference signal having substantially the frequency of the received pulse carriers are passed through the various circuits of the receiver until they reach the output of the intermediate frequency stage, at which point these signals are simultaneously recorded on separate channels by storage medium 10. When convenient, a selected portion or section of the recorded message comprising a number of pulse transmissions is repetitively played back at a predetermined rate, a synchronizing pulse being produced at the start of each scan, as mentioned earlier. This synchronizing pulse is applied via line 13 to sawtooth horizontal sweep generator 16 which, as its name implies, generates a sawtooth signal that is applied to the vertical plates of cathode-ray tube 22, thereby producing a horizontal sweep on the face of the tube. Thus, each horizontal sawtooth sweep on the face of tube 22 is synchronized with the start of each repetition of the message section being read out of storage medium 10 and constitutes a horizontal axis representing time, as indicated by lines 24 in FIGS. 2(a) and 2(b).

The reference signal, which is initially at frequency ($f_0 \pm \Delta f$), where as heretofore mentioned $\Delta f$ is an incremental variation of $f_0$, is applied to mixer and side-band filter circuit 15 and is passed both by this circuit and phase shifter circuit 20 to sawtooth vertical sweep generator circuit 23 wherein, in the manner previously explained, a sawtooth voltage is generated during each cycle of the reference signal commencing with the positive-going zero cross-over point thereof. Thus, the reference signal oscillations ultimately produce a corresponding series of sawtooth voltages whose period exactly coincides with that of the oscillations starting with the positive-going zero cross-over points thereof. The sawtooth signals out of circuit 23 are then applied to the horizontal plates of cathode-ray tube 22, with the result that a plurality of vertical sweeps appear on the face of the tube. It will be recognized that since a horizontal sweep is produced only once during each scan of a message section and a vertical sweep is produced for each cycle of the reference signal oscillations, there will be a much larger number of vertical sweeps than horizontal sweeps appearing on the face of tube 22, the ratio of vertical to horizontal sweeps being equal to the ratio of the reference signal frequency and the frequency at which the synchronizing pulse is generated. Consequently, for all practical purposes, the vertical sweeps will appear on the cathode ray screen as a plurality of closely and parallely spaced vertical lines, as indicated by lines 25 in FIGS. 2(a) and 2(b), the lines coinciding in time with the occurrence of the positive-going zero cross-over points of the reference signal oscillations.

During each scan of a message section, the phase-coded message pulses whose carriers are at frequency $f_0$ are applied to signal brightness pulse generator 14 and, in accordance with the previous description, circuit 14 produces positive voltage spikes at the positive-going zero cross-over points of the message carriers. Thus, the output of circuit 14 is a succession of groups of positive voltage spikes, each group of such spikes corresponding to a message pulse and each spike in a group corresponding to the start of a cycle in the associated pulse carrier. It will at once be obvious that the rate at which these voltage spikes are generated is the same as the carrier frequency of the recorded message pulses.

The aforementioned groups of voltage spikes are applied to the cathode element of cathode-ray tube 22 and, in consequence thereof, a very bright spot will appear on the face of the tube for each applied spike, the bright spots being positioned along vertical sweep lines 25, as shown by dots 26 in FIGS. 2(a) and 2(b). If the frequency of the reference signal is the same as that of the message carrier, namely $f_0$, then the positive-going zero cross-over points of the two signals will always have the same time relationship with respect to each other, that is to say, they will be displaced from each other by a fixed amount depending upon the phase angle between the two signals, with the result that the bright spots on the face of the tube will occur at the same height above horizontal sweep line 24 so that each group of brights spots formed will lie along a horizontal straight line. On the other hand, if a frequency difference exists between the reference and aforesaid message carrier signal then, since frequency is the time rate of change of phase, the time relationship or time spacing between corresponding positive-going zero cross-over points of the two signals will vary linearly with time and the bright spots on the cathode-ray tube screen will fall on sloping, rather than horizontal, straight lines, the slope of these lines being indicative of the difference in frequency between the two signals, which is to be corrected. The positioning of bright spots 26 along sloping and horizontal lines is respectively shown in FIGS. 2(a) and 2(b).

Considering the operation still further, in the event that a frequency difference exists between the reference and message carrier signals, as indicated by a sloping arrangement of spots 26 on the face of tube 22, in FIG. 2(a), the frequency of the reference signal may be corrected until it is the same as that of the carriers. This is done by varying the frequency of the beat signal produced by oscillator 17 until the heterodyning of the reference and beat signals in mixer circuit 17 produces a signal at the output thereof whose frequency is that of the message carrier, namely $f_0$, at which time spots 26 will align themselves along a horizontal line on the face of tube 22, as shown in FIG. 2(b).

Although the series of brightened dots representing each message pulse now fall on a horizontal line segment, the segments representing different pulses have different vertical positions, depending on their respective modulation. If the phase of the reference signal driving the vertical sweep is now shifted with the aid of phase shifter circuit 20, the line segments representing marker pulses may be moved vertically until they fall under a horizontal line scribed over the face of the cathode-ray tube. The dotted line segments representing message pulses will now fall under this or one of $N-1$ other lines, where N is the number of different phases employed for modulation. The operator may then visually decode this message section according to the phase-code used. The storage read-out is then shifted to the next section of the message, any necessary readjustment of the reference frequency is made, and demodulation accomplished in the same manner.

In the event that noise, which is ever present, clouds the tube display to the extent that it becomes difficult to distinguish or recognize the brightened spots above those produced by the noise, the embodiment of FIG. 1 may be modified to reduce these effects. Specifically, to the embodiment of FIG. 1 is added a Nth harmonic bandpass filter 27, another sawtooth vertical sweep generator 28 and a second cathode ray tube 30 in the manner shown in FIG. 3. As shown therein, Nth harmonic filter 27 is connected to the output of vertical sweep generator 23, vertical sweep generator 28 being connected between this filter and horizontal plates of cathode ray tube 30. The vertical plates and the cathode of tube 30 are, like cathode ray tube 22, respectively connected to horizontal sweep generator 16 and brightening pulse generator 14.

Figure 3:
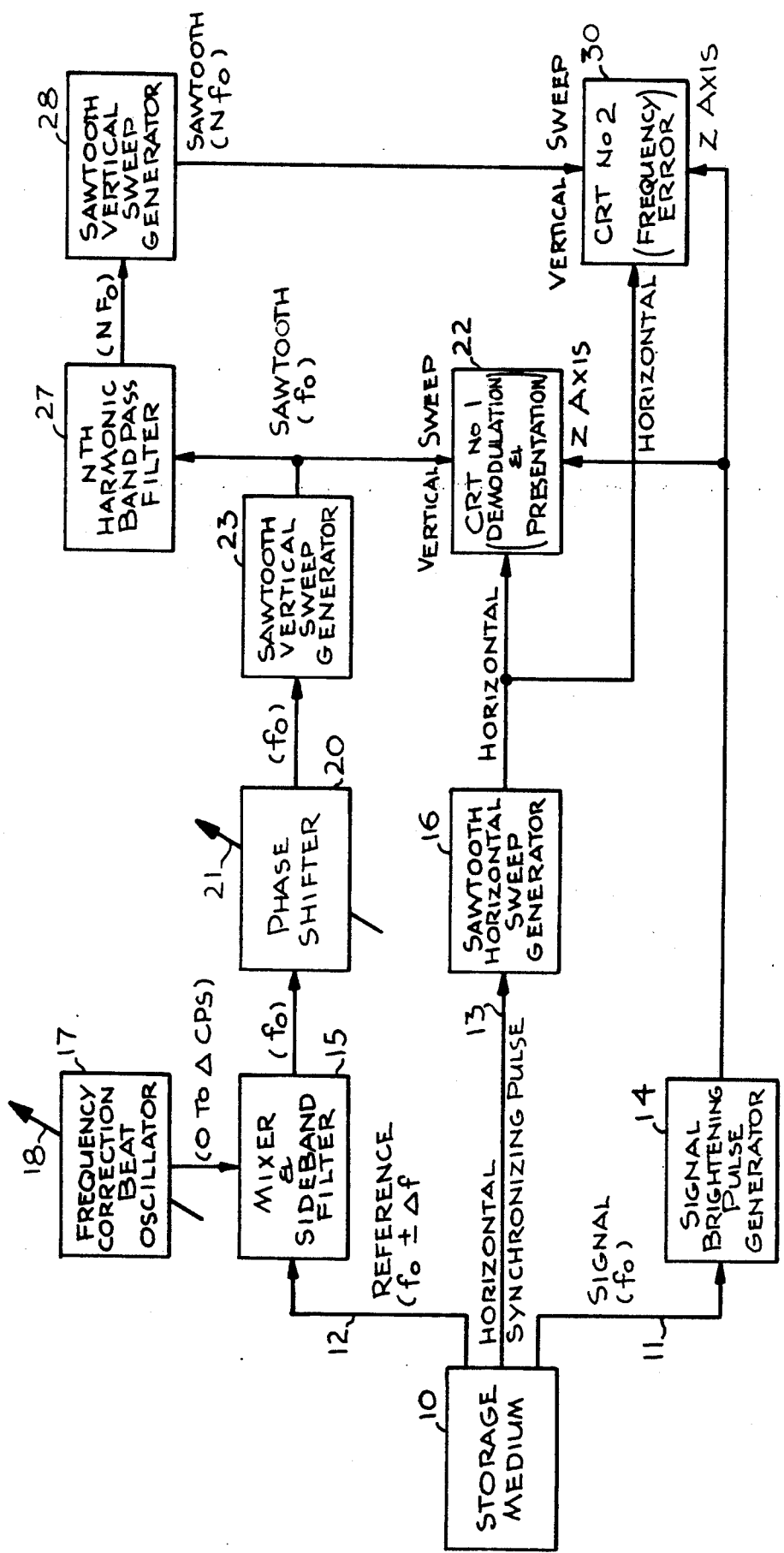
FIG. 3 shows a block diagram of the embodiment of FIG. 1 in modified form.

The operation of the embodiment shown in FIG. 3 is substantially identical with that of the FIG. 1 embodiment, the exception being that now tube 30 is used for correcting frequency difference between the reference and message carrier signals and tube 22 is used for demodulation and presentation. It will be remembered that tube 22 was previously used for all three purposes.

More specifically, horizontal sweep generator 16 produces the same horizontal sweep in tube 30 as it does in tube 22. Similarly, the positive voltage spikes out of brightening pulse generator are applied to the cathode of both tubes 22 and 30. With respect to the sawtooth output of vertical sweep generator 12, in addition to being applied to tube 22, this output is also applied to Nth harmonic filter circuit 27 which passes only the Nth harmonic of the reference signal to vertical sweep generator 28. Consequently, the sawtooth output of generator 28 has N times the repetition rate of the sawtooth output of sweep generator 23, with the result that the number of vertical sweep lines displayed on the face of tube 30 is N times that displayed on tube 22. Thus, each sweep on tube 30 represents $2\pi/N$ radians of a reference signal cycle whereas each sweep on tube 22 in both FIGS. 1 and 2 represents $2\pi$ radians, that is, represents an entire reference signal cycle. In this manner it becomes easier to identify the brightening spots produced by the pulses out of generator 14 corresponding to the positive-going zero cross-over points of the message carriers.

The correction of frequency, demodulation and presentation is accomplished in the same manner as with the apparatus of FIG. 1, namely, oscillator 17 is adjusted until the lines of bright spots on the face of tube 30 are horizontally oriented at which time phase shifter 20 is adjusted until the horizontal line segments on the face of tube 22 are properly positioned for easy readout, as previously described.

Figure 4:
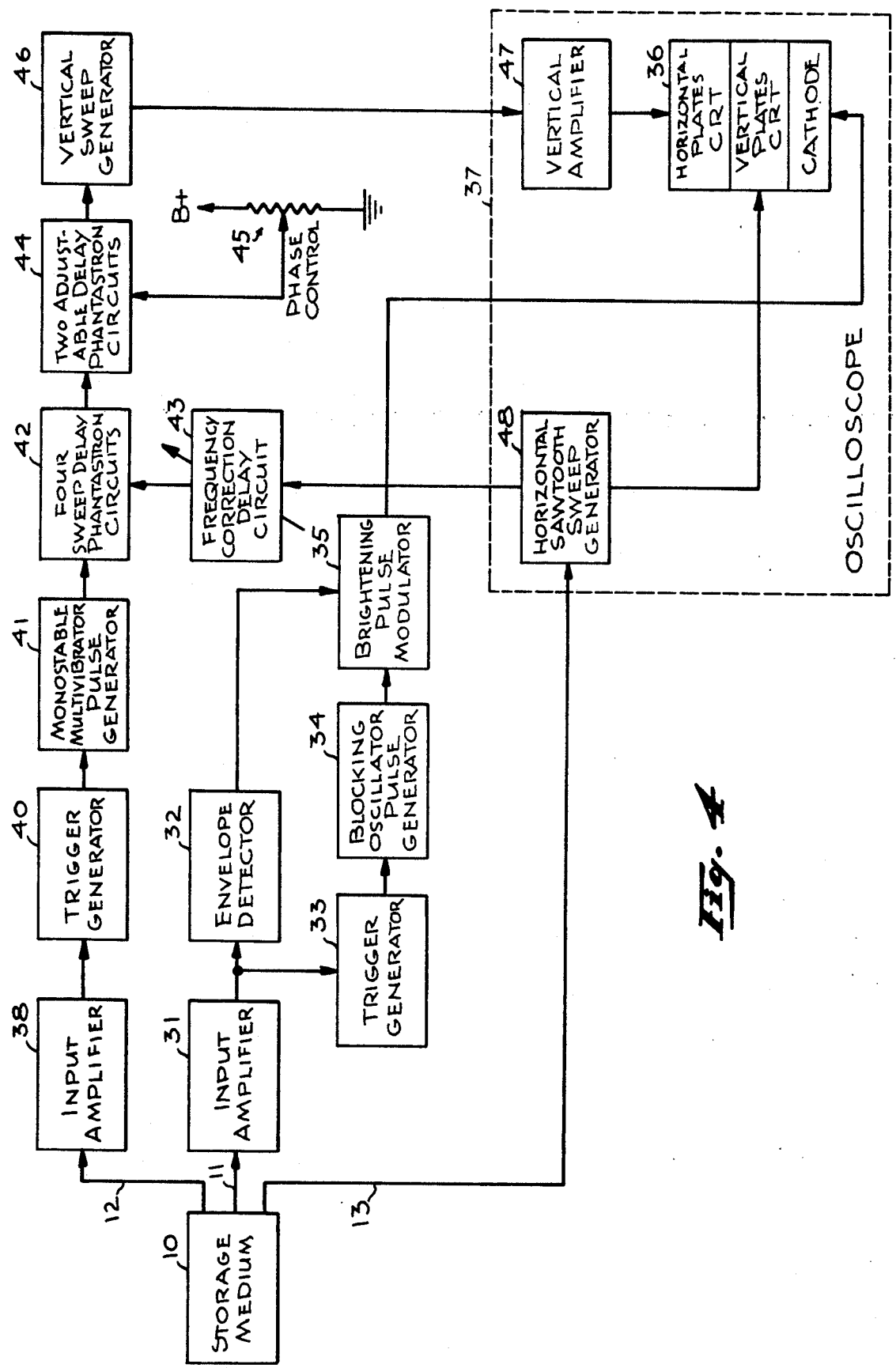
FIG. 4 shows a block diagram of another embodiment of receiver apparatus according to the present invention.

Referring now to FIG. 4, there is shown still another embodiment of the present invention which includes storage medium To previously described. Thus, the storage medium has three output lines 11, 12 and 13, the message signal at frequency $f_0$ being produced at line 11, the reference signal at frequency ($f_0 \pm \Delta f$) being produced at line 12 and a horizontal synchronizing pulse being generated at line 13.

Storage medium 10 is connected through line 11 to an amplifier 31 whose output is connected to both an envelope detector 32 and a trigger generator 33 which, in turn, is connected to a blocking oscillator 34. The blocking oscillator is connected to one of two inputs to a brightening pulse modulator 35, the second modulator input being connected to the output of envelope detector 32. The output end of modulator 35 is connected to the cathode of a cathode-ray tube 36 mounted in an oscilloscope 37.

Storage medium 10 is connected through line 12 to an input amplifier 38 and through the amplifier to a trigger generator 40. The output end of trigger generator 40 is connected to a monostable multivibrator pulse generator 41 whose output, in turn, is connected to the first of two inputs to a plurality of phantastron circuits 42 connected in tandem, the second phantastron circuit input being connected to a frequency-correction delay circuit 43. A second set of phantastron circuits 44, also having two input terminals, is respectively connected at its first and second input terminals to phantastron circuits 42 and a phase control or correction circuit generally designated 45, the output end of phantastron circuits 44 being connected to a vertical sweep generator 46. The vertical sweep generator feeds a vertical amplifier 47 and the vertical amplifier drives the horizontal plates of cathode-ray tube 36 in oscilloscope 37.

Considering the channel of line 12 in somewhat greater detail, input amplifier 38 may be a two-stage low-noise amplifier that drives a first set of clipper diodes thereby producing a clipping action on the individual oscillations of the reference pulse out of storage medium 10. Trigger generator 40 may be a two-stage clipper amplifier which produces an output square wave having an extremely short rise time. As for monostable multivibrator pulse generator 41, this circuit may in sequence comprise a differentiator, amplifier-inverter, and a cathode follower to deliver a positive trigger pulse to phantastron circuits 42.

Phantastron circuits 42 and 44 and vertical sweep generator 46 are standard circuits and, hence, no detailed description of them is deemed necessary. However, it should be mentioned that the quiescent operating voltages of each phantastron tube is such that plate current remains cut off and only screen current flows until a positive trigger pulse is applied to the injection grid thereof. When this happens, plate current starts to flow and the plate voltage of the associated phantastron falls in a linear fashion for a duration determined by the time-constant of the control-grid circuit and a plate delay potential applied to the tube. A cathode-follower circuit is used to couple the plate signal back to the control grid through a feedback capacitor to permit a short recovery time. The screen-grid voltage increases for the duration of the phantastron action and, on termination of this action, falls sharply back to its quiescent value. This screen signal is differentiated and the trailing pulse is amplified and cathode-follower coupled to the injection grid of the next phantastron delay circuit preferably through a disconnect diode.

The output trigger pulse from the last circuit of the phantastron delay chain triggers vertical sweep generator 46.

Phantastron delay circuits 42 and 44 derive their delay potential from two sources, namely, frequency and phase-correction circuits 43 and 45, respectively, circuit 43 introducing an adjustable sawtooth delay potential to circuit 42 and circuit 45 introducing an adjustable direct-current delay potential to circuit 44. The sawtooth delay potential is obtained from the horizontal sawtooth output of oscilloscope 37, the base line of the sawtooth and the final value to which the sawtooth rises being fixed by circuit 43. The thusly limited sawtooth voltage is applied through a cathode-follower, a cathode-coupled amplifier, a slope-control potentiometer, and a direct-coupled cathode follower included in circuit 43 to phantastron delay circuits 42. The setting of the slope potentiometer (connected between the push-pull plates of the cathode-coupled amplifier) determines the peak-to-peak amplitude of the sawtooth delay potential and whether the slope of this sawtooth is positive or negative. In the two extreme positions of this control, the phantastron delay is swept respectively from the maximum to the minimum and from the minimum to the maximum usable phantastron delay range.

The direct-current adjustable-delay potential for phantastron phase-correction delay circuits 44 is derived from phase control circuit 45 which is basically a variable voltage divider connected between a positive source of voltage and ground. The setting of the phase control fixes the delay potential whose limits correspond to the maximum and minimum delay of the usable delay range of phantastron delay circuits 44.

Referring again to storage medium 10, the storage medium is connected through line 13 to a horizontal sawtooth sweep generator 48 in oscilloscope 37, the output of sweep generator 48 being connected to both the vertical plates of cathode ray tube 36 and frequency-correction delay circuit 43.

In operation, the horizontal synchronizing pulse periodically generated at line 13 is applied to horizontal sawtooth sweep generator 48 which, in response thereto, produces a sawtooth signal that is applied to the vertical plates of cathode-ray tube 36, thereby producing a horizontal sweep on the face of the tube. Thus, as mentioned previously, each horizontal sawtooth sweep on the face of tube 36 is synchronized with the start of each repetition of the message section being read out of storage medium 10 and constitutes a horizontal axis representing time.

The reference signal at frequency $f_0 \pm \Delta f$ is applied via line 12 to input amplifier 38 which, as its name implies, amplifies the reference signal and applies it to trigger generator 40. The trigger generator clips and amplifies and then clips again the radio-frequency oscillations of the reference signal to produce a square-wave signal therefrom having an extremely short rise time. This square-wave signal is applied to monostable multivibrator pulse generator 41 wherein the square-wave signal is differentiated to produce both positive and negative voltage spikes corresponding to the crossover points of the reference signal oscillations. The train of positive voltage spikes is applied to the first phantastron stage of phantastron circuits 42 and, in response to each of them, the first phantastron circuit produces a pulse whose duration is determined by the delay potential signal out of frequency correction delay circuit 43. The phantastron pulse is differentiated and the trailing voltage spike is applied to the next phantastron stage of circuits 42. This operation is continued for all the stages in phantastron circuits 42, the trailing pulse or spike out of the last stage therein being applied to phantastron circuits 44. Thus, a very considerable range of time delays can be interposed between a voltage spike into phantastron circuits 42 and the corresponding voltage spike out of there, the delay being variable under the control of the delay potential out of frequency correction delay circuit 43, as previously explained.

The voltage spikes produced by the last phantastron stage of circuits 42 are applied to phantastron delay circuits 44 wherein the same phenomena occur as in circuits 42. Hence, no further description is deemed necessary in connection with phantastron circuits 44 except to say that the duration of its pulses and, therefore, the time delay between the spikes applied to and out of circuits 44 is controlled by the direct-current voltage produced by phase control 45. The voltage spikes produced by phantastron circuits 44 are applied to vertical sweep generator 46, each such spike triggering the generation therein of a sawtooth voltage. These sawtooth voltages are applied to vertical amplifier 47 wherein they are amplified and are thereafter applied to the horizontal plates of cathode ray tube 36. As a result, a series of vertical sweeps appear on the face of tube 36, there being a plurality of such vertical sweeps for each horizontal sweep, the vertical sweep rate differing from the frequency of the reference signal according to the delays introduced by the phantastron circuits.

Considering now line 11 out of storage medium 10, the phase-coded message pulses are applied through input amplifier 31, wherein they are amplified, to both trigger generator 33 and envelope detector 32. In response to each message pulse, the trigger generator produces a square-wave signal corresponding to the message pulse carrier, the square waves having extremely short rise times. These square waves are applied to blocking oscillator 34 which operates in response to the square waves to produce very sharp voltage pulses or spikes coinciding in time with the leading edges of the square waves. Thus, the pulses produced by blocking oscillator 34 also coincide in time with the positive-going cross-over points of the message carrier. The output of the blocking oscillator is applied to brightening pulse modulator 35.

With respect to the message pulses applied to envelope detector 32, the detector detects the pulses as the name implies and produces output voltage pulses whose amplitudes vary as the envelopes of the message carriers. These voltages are also applied to brightening pulse modulator 35 wherein they modulate the voltage spikes applied by blocking oscillator 34. As a result, the output of modulator 35 consists of a train of groups of voltage spikes whose amplitudes vary as the modulating voltage out of envelope detector 32. Each group of amplitude-modulated voltage spikes is applied to the cathode of cathode-ray tube 36, each voltage spike therein causing a bright spot to occur on the cathode-ray tube screen. Thus, a line of bright spots will appear on the face of the cathode-ray tube for each group of pulses applied to the cathode, each line of spots corresponding to the positive-going cross-over points of the associated message pulse carrier and their relative brightness providing an indication of the manner in which the envelope of the message pulse carrier varies.

For the reasons presented heretofore, if the frequency of the message carrier is different from the frequency of the reference signal, the lines of spots appearing on the face of cathode-ray tube 36 will be inclined as shown in FIG. 2(a), the slopes of the lines being indicative of the frequency difference between the two signals. Frequency correction can be made by adjustment of the various time delays produced in phantastron circuits 42 and, when this is done, the bar or line segments align themselves horizontally as shown in FIG. 2(b) which indicates that the message carriers and reference signal are of the same frequency. Furthermore, the vertical position of a bar representing each pulse is a function of the phase modulation imposed on that pulse and the phase error due to any difference between the actual and expected carrier phase. Adjustment of phase control 45 permits cancellation of error due to phase uncertainty. When these adjustments have been made, each pulse falls at or near one of several vertical positions corresponding to the several phases, as shown in FIG. 2(b). The message or information is then contained in the vertical positions of the pulses.

Having thus described the invention, what is claimed as new is:

1. Receiver apparatus for demodulating phase-coded message signals and visually displaying the resultant information, said apparatus comprising: a memory unit including a storage medium upon which is recorded a reference signal and the phase-coded message signals at substantially the same frequency, and means for periodically generating a pulse; a first sweep generator coupled to said storage medium and operable in response to the reference signal recorded thereon to produce a first sawtooth signal whose repetition rate is equal to the frequency of said reference signal; a second sweep generator coupled to said means and operable in response to the pulses produced thereby to produce a second sawtooth signal whose repetition rate is equal to the pulse repetition rate; an oscilloscope coupled to said first and second sweep generators for receiving said first and second sawtooth signals, said oscilloscope being operable in response to said first and second sawtooth signals to produce corresponding vertical and horizontal sweeps on the cathode ray tube face thereof; and a brightening pulse generator coupled between said storage medium and the cathode of the cathode ray tube of said oscilloscope, said pulse generator being operable in response to each phase-coded message signal to produce voltage spikes at predetermined polarity crossover points of the message signal carrier oscillation, said voltage spikes being applied to the cathode of said cathode ray tube to produce a bar of bright spots on the screen thereof for each message signal, the vertical positions of said bars corresponding to the phase modulation of the message signal carriers.

2. The receiver apparatus defined in claim 1 wherein said apparatus further includes frequency-correction means coupled between said storage medium and said first sweep generator for adjusting the frequency of said reference signal until the frequency thereof is equal to the frequency of the message signal carrier.

3. The receiver apparatus defined in claim 2 wherein said frequency-correction means includes a mixer circuit coupled between said storage medium and said first sweep generator, and a variable-frequency oscillator coupled to said mixer circuit for applying a signal thereto whose frequency is equal to the difference between said reference signal and message signal carrier frequencies.

4. The receiver apparatus defined in claim 2 wherein said apparatus further includes a phase shifter coupled between said frequency-correction means and said first sweep generator for varying the phase of said reference signal in order to correspondingly vary the vertical positions of said bars of bright spots on the cathode ray tube screen.

5. In a receiver system wherein reference and phase-coded message signals are received and synchronizing pulses produced, apparatus for demodulating the message signals and visually displaying the resultant message information, said apparatus comprising: a first sweep generator receptive of the reference signal and operable in response thereto to produce a first sawtooth signal whose repetition rate is equal to the frequency of the reference signal; a second sweep generator receptive of the synchronizing pulses and operable in response thereto to produce a second sawtooth signal whose repetition rate is equal to the pulse repetition rate; an oscilloscope coupled to said first and second sweep generators for receiving said first and second sawtooth signals, said oscilloscope being operable in response to said first and second sawtooth signals to produce corresponding vertical and horizontal sweeps on the cathode ray tube face thereof; and a brightening pulse generator coupled between said storage medium and the cathode of the cathode ray tube of said oscilloscope, said pulse generator being operable in response to each phase-coded message signal to produce voltage spikes at predetermined polarity crossover points of the message signal carrier oscillations, said voltage spikes being applied to the cathode of said cathode ray tube to produce a bar of bright spots on the screen thereof for each message signal, the vertical positions of said bars corresponding to the phase modulation of the message signal carriers.

6. The apparatus defined in claim 5 wherein said apparatus further includes frequency-correction means receptive of the reference signal and coupled to said first sweep generator for adjusting the frequency of said reference signal so that said frequency is equal to the frequency of the message signal carrier.

7. The apparatus defined in claim 6 wherein said frequency-correction means includes a mixer circuit receptive of the reference signal and coupled to said first sweep generator, and a variable-frequency oscillator coupled to said mixer circuit for applying a signal thereto whose frequency is equal to the difference between the reference signal and message signal carrier frequencies.

8. The apparatus defined in claim 2 wherein said apparatus further includes a phase shifter circuit coupled between said frequency-correction means and said first sweep generator for varying the phase of the reference signal in order to correspondingly vary the vertical positions of said bars of bright spots on the cathode ray tube screen.

9. In a receiver system wherein reference and phase-coded message signals are received and synchronizing pulses produced, apparatus for demodulating the message signals and visually displaying the resultant signal information on an oscilloscope screen, said apparatus comprising: a first sweep generator receptive of the reference signal and operable in response thereto to produce a first sawtooth signal whose repetition rate is equal to the frequency of the reference signal, said sawtooth signal being applied by said first sweep generator to the cathode ray tube in the oscilloscope to produce a plurality of vertical sweeps on the screen thereof, one vertical sweep for each sawtooth variation; a second sweep generator receptive of the synchronizing pulses and operable in response thereto to produce a second sawtooth signal whose repetition rate is equal to the pulse repetition rate, said sawtooth signal being applied by said second sweep generator to the cathode ray tube in the oscilloscope to produce a horizontal sweep on the screen thereof for each sawtooth variation; and a brightening pulse generator receptive of the phase-coded message signals and operable in response to each such signal to produce voltage spikes at predetermined polarity crossover points of the message signal carrier oscillations, said voltage spikes being applied by said pulse generator to the cathode of the cathode ray tube in the oscilloscope to produce a bar of bright spots on the screen thereof for each message signal, the vertical positions of said bars corresponding to the phase modulation of the message signal carriers.

10. The apparatus defined in claim 9 wherein said apparatus further includes frequency-correction means receptive of the reference signal and coupled to said first sweep generator for adjusting the frequency of the reference signal until said frequency is equal to the frequency of the message signal carrier.

11. The apparatus defined in claim 10 wherein said frequency-correction means includes a mixer circuit receptive of the reference signal and coupled to said first sweep generator, and a variable-frequency oscillator coupled to said mixer circuit for applying a signal thereto whose frequency is equal to the difference between the reference signal and message signal carrier frequencies.

12. The apparatus defined in claim 10 wherein said apparatus further includes a phase shifter circuit coupled between said frequency-correction means and said first sweep generator for varying the phase of the reference signal in order to correspondingly vary the vertical positions of said bars of bright spots on the cathode ray tube screen.

13. In a receiver system wherein reference and phase-coded message signals are received and synchronizing pulses produced, apparatus for demodulating the message signals and visually displaying the resultant signal information on an oscilloscope screen, said apparatus comprising: a first sweep generator receptive of the reference signal and operable in response thereto to produce a first sawtooth signal whose repetition rate is equal to the frequency of the reference signal, said sawtooth signal being applied by said first sweep generator to the cathode ray tube in the oscilloscope to produce a plurality of vertical sweeps on the screen thereof, one vertical sweep for each sawtooth variation; a second sweep generator receptive of the synchronizing pulses and operable in response thereto to produce a second sawtooth signal whose repetition rate is equal to the pulse repetition rate, said sawtooth signal being applied by said second sweep generator to the cathode ray tube in the oscilloscope to produce a horizontal sweep on the screen thereof for each sawtooth variation; a brightening pulse generator receptive of the phase-coded message signals and operable in response to each such signal to produce voltage spikes at predetermined polarity crossover points of the message signal carrier oscillations, said voltage spikes being applied by said pulse generator to the cathode of the cathode ray tube in the oscilloscope to produce a bar of bright spots on the screen thereof for each message signal, the vertical positions of said bars corresponding to the phase modulation of the message signal carriers; means coupled between said first sweep and brightening pulse generators and operable in response to the signals therefrom to produce an output indication of the difference in frequency between the reference signal and the message signal carriers; and frequency-correction means receptive of the reference signal and coupled to said first sweep generator for applying the reference signal thereto, said correction-frequency means being operable to adjust the frequency of the reference signal until the difference in frequency between the reference signal and the message signal carriers is reduced to zero.

14. The apparatus defined in claim 13 wherein said frequency-correction means includes a mixer circuit receptive of the reference signal and coupled to said first sweep generator, and a variable-frequency oscillator coupled to said mixer circuit for applying a signal thereto whose frequency is equal to the difference between the reference signal and message signal carrier frequencies.

15. The apparatus defined in claim 13 wherein said means includes a band-pass filter coupled to said first sweep generator for passing only a predetermined harmonic of the reference signal; a third sawtooth sweep generator coupled to said band-pass filter for receiving the reference signal harmonic therefrom, said third sweep generator being operable to said harmonic signal to produce a third sawtooth signal whose repetition rate is equal to the frequency of said harmonic signal; and an additional oscilloscope whose cathode ray tube is coupled to said second and third sweep generators and to said brightening pulse generator, said second sawtooth signal producing a horizontal sweep on the screen of said cathode ray tube for each sawtooth variation, said third sawtooth signal producing a plurality of vertical sweeps on the screen of said cathode ray tube, one vertical sweep for each sawtooth variation, and said voltage spikes producing a bar of bright spots on the screen of said cathode ray tube for each message signal, the slope of each of said bars corresponding to the difference between the reference signal and the message signal carrier frequencies.

16. In a receiver system wherein reference and phase-coded message signals are received and synchronizing pulses produced, apparatus for demodulating the message signals and visually displaying the resultant signal information on an oscilloscope screen, said apparatus comprising: first input means receptive of the reference signal and operable in response thereto to produce a first train of voltage pulses coinciding in time with alternate crossover points of the oscillations thereof; first and second pluralities of phantastron circuits connected in tandem, said first plurality of phantastron circuits being operable in response to said first train of voltage pulses to produce a second train of voltage pulses whose pulse repetition frequency may be varied above and below the pulse repetition frequency of said first train of pulses, said second plurality of phantastron circuits being operable in response to said second train of pulses to produce a third train of voltage pulses having the same pulse repetition frequency as and that may be made to lead and lag said second train of pulses; a vertical sweep generator coupled to said second plurality of phantastron circuits and operable in response to said third train of pulses to produce a corresponding train of sawtooth signals, said sawtooth signals being applied to the oscilloscope to produce a corresponding plurality of vertical sweeps on the screen thereof; a horizontal sweep generator receptive of the synchronizing pulses and operable in response thereto to produce another train of sawtooth signals whose repetition rate is equal to the repetition rate of the synchronizing pulses, said other train of sawtooth signals being applied to the oscilloscope to produce a corresponding plurality of horizontal sweeps on the screen thereof; second input means receptive of the phase-coded message signals and operable in response to each such signal to produce voltage spikes at alternate polarity crossover points of the message signal carrier oscillations, said voltage spike being applied by said second input means to the cathode of the cathode ray tube in the oscilloscope to produce a bar of bright spots on the screen thereof for each message signal, the vertical positions of said bars corresponding to the phase difference between the message signal carriers and the reference signal and the slope of said bars corresponding to the difference in frequency between the reference signal and message signal carriers; a frequency correction circuit coupled between said first plurality of phantastron circuits and said horizontal sweep generator, said frequency correction circuit being operable in response to the sawtooth signals out of said horizontal sweep generator to produce delay voltages for varying the pulse repetition frequency of said second train of pulses until it is substantially equal to the pulse repetition frequency of said voltage spikes out of said second output means whereby the slope of said bars of bright spots is reduced to zero; and a phase-correction circuit for producing a phase control voltage, said phase correction circuit being coupled to said second plurality of phantastron circuits to apply said phase control voltage thereto for shifting the phase of said third train of pulses relative to said second train of pulses until the vertical positions of said bars respectively correspond to the phase modulation of the message signal carriers.

17. The apparatus defined in claim 16 wherein said first input means includes a clipper circuit for clipping the oscillations of the reference signal to produce corresponding square-wave voltage variations, and a differentiating circuit for producing said first train of voltage pulses.

18. The apparatus defined in claim 16 wherein said second input means includes an envelope detector circuit receptive of the message signals and operable in response thereto for producing corresponding voltage pulses whose amplitudes correspond to the amplitudes of the message signal envelopes, respectively; a clipper circuit receptive of the message signals and operable to clip the oscillations of the message signal carriers to produce corresponding square-wave voltage signals; pulsing means coupled to said clipper circuit and operable in response to the square-wave signals therefrom to produce voltage spikes at alternate polarity crossover points in said square-wave signals; and a brightening pulse modulator coupled between the cathode of the cathode ray tube in the oscilloscope and said envelope detector circuit and pulsing means, said modulator being operable in response to said voltage spikes and said voltage signals to apply corresponding voltage spikes modulated by said voltage signals to said cathode.

* * * * *